United States Patent [19]
Kuwahara et al.

[11] Patent Number: 5,353,281
[45] Date of Patent: Oct. 4, 1994

[54] INTERMITTENCELESS SWITCHING SYSTEM

[75] Inventors: Hiroshi Kuwahara, Kodaira; Kazuhiro Suzuki, Koganei; Toshikazu Sasa; Kenzo Urabe, both of Sendai; Arata Nakagoshi; Hideya Suzuki, both of Kokubunji; Yohichi Ogawa, Hayama; Tsuneo Furuya, Yokohama; Yoshinobu Yamamoto, Fujisawa, all of Japan

[73] Assignees: Kokusai Electric Co., Ltd.; Hitachi, Ltd., both of Tokyo, Japan

[21] Appl. No.: 889,952

[22] Filed: May 29, 1992

[30] Foreign Application Priority Data

May 31, 1991 [JP] Japan .................. 3-155971

[51] Int. Cl.⁵ ........................... H04Q 11/04
[52] U.S. Cl. ..................... 370/58.1; 370/95.3
[58] Field of Search ............ 370/58.1, 58.2, 95.1, 370/95.3, 60, 110.1; 455/33.1, 33.4, 54.1

[56] References Cited

U.S. PATENT DOCUMENTS

| | | | |
|---|---|---|---|
| 4,597,079 | 6/1986 | Aoki et al. | 370/95.3 |
| 4,941,141 | 7/1990 | Hayano | 370/58.1 |
| 5,040,174 | 8/1991 | Takeuchi et al. | 370/58.1 |
| 5,042,082 | 8/1991 | Dahlin | 370/95.1 |

Primary Examiner—Douglas W. Olms
Assistant Examiner—Shick Hom
Attorney, Agent, or Firm—Sixbey, Friedman, Leedom & Ferguson

[57] ABSTRACT

An intermittenceless switching system includes two speech path memories having sufficient capacity to store a single frame of data having a plurality of time slots. The incoming data is stored in one memory, while the outgoing data is read from the other memory. A control circuit continuously alternates the read/write functions between the two memories. A control memory is used to store switch control information. The system includes a buffer memory that is present between a data processor and the control memory to prevent switch operation during data transmission. The system also includes a monitoring circuit for detecting an indication bit signifying the presence or absence of data in the time slot.

3 Claims, 9 Drawing Sheets

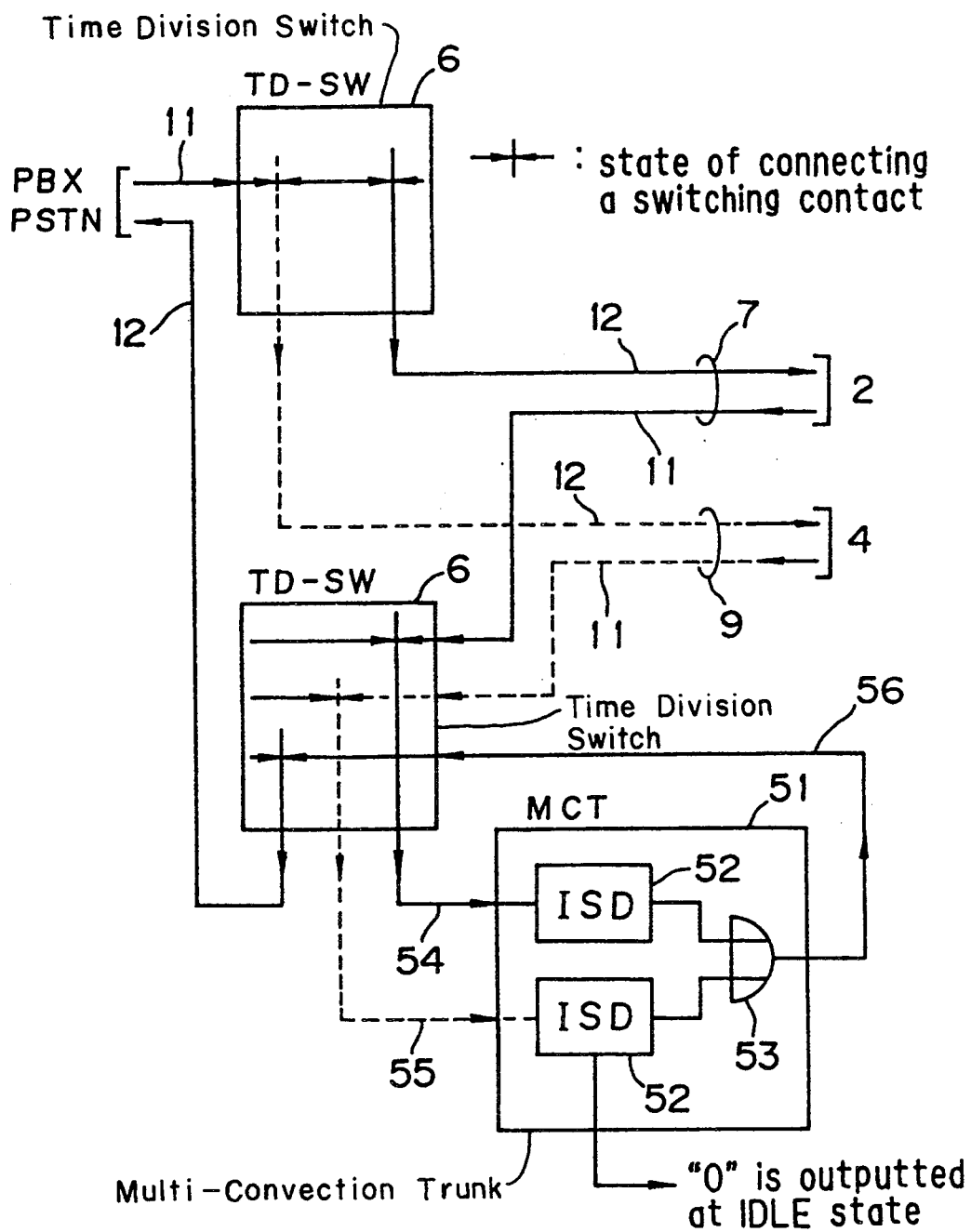

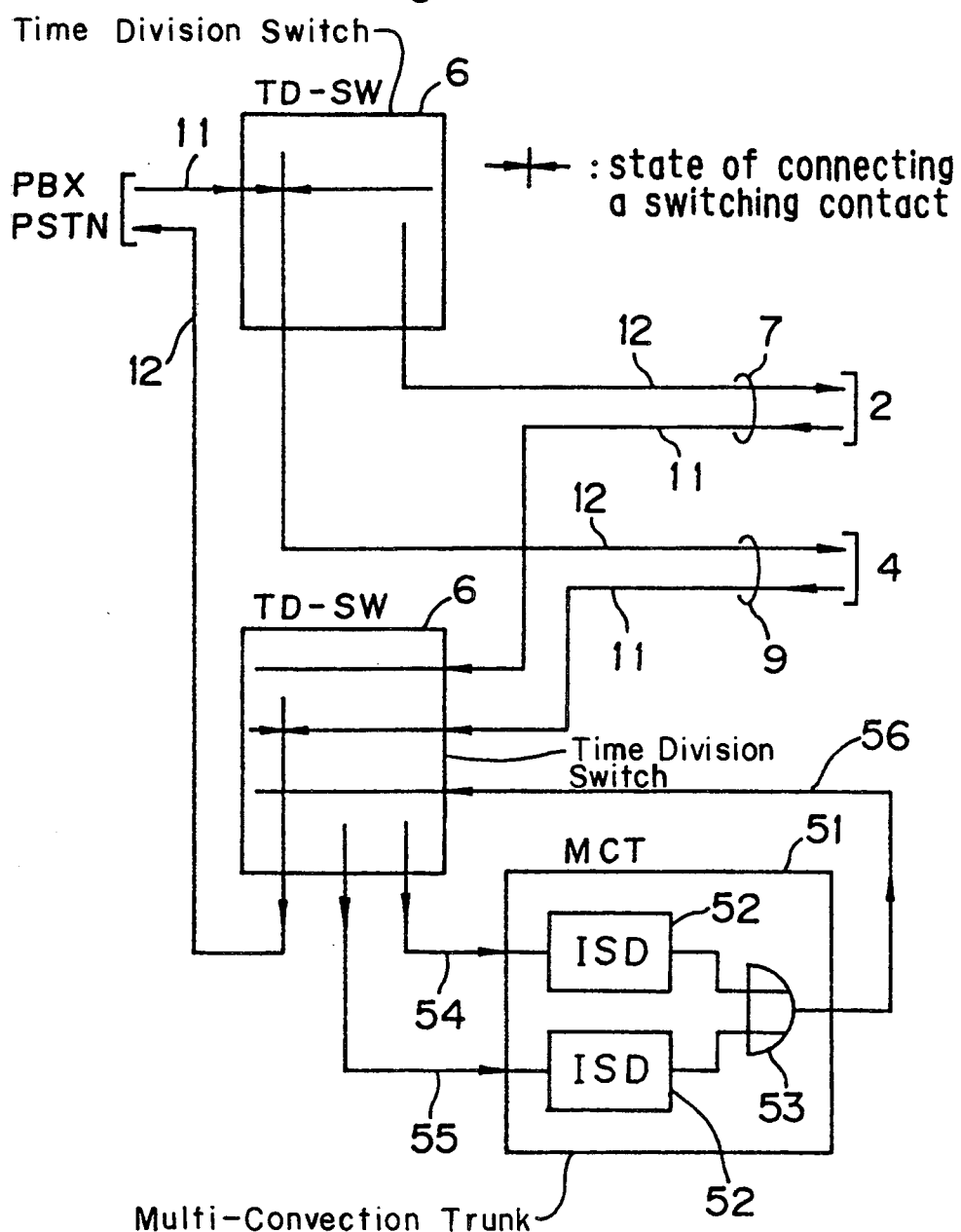

prior to the hand-over
(double connection)

hand-over termination
(double connection)

after processing the hand-over

⇧ point of the switching

⇧ point of the switching

INTERMITTENCELESS SWITCHING SYSTEM

BACKGROUND OF THE INVENTION

The present invention relates to an intermittenceless switching system capable of switching one communication zone to the other without losing information in a mobile communication system while a speech is being carried out through a communication channel corresponding to the communication zone and a portable station moves from one communication zone to the other with the speech remained.

The switching state of communication zones during the speech is illustrated on FIGS. 7A, 7B, 7C and 7D in a conventional mobile communication system. An example of a time division switch is illustrated on FIG. 8 for use in the mobile communication system. Time charts describing switching states of the communication channels are illustrated on FIGS. 9A, 9B, 9C, 9D, and FIGS. 10A and 10B when using the time division switch 6 in FIG. 8. The conventional mobile communication system is described in accordance with the drawings hereinafter.

FIGS. 7A, 7B, 7C and 7D illustrate the transition of the operation states when swotching the communication zone (referring to as hand-over below) during the speech, in which FIG. 7A shows a normal speech state prior to the hand-over, FIGS. 7B and 7C shows while the hand-over is being carried out, and FIG. 7D shows the normal speech state after the hand-over is terminated.

As illustrated in FIG. 7A, reference numeral 1 denotes a portable station (referred to as PS in the drawings), 2 denotes one fixed station (referring to as FS in the drawings) connected with the portable station 1 during the speech through a radio channel 3 in a communication zone, 4 denotes the other fixed station for use in the other communication zone where the portable station 1 is intended to move therein, 5 denotes line control equipment (referred to as LCE in the drawings) equipped with the fixed stations 2 and 4, and 6 denotes a time division switch shown in FIG. 8, as a higher rank, equipped in the line control equipment 5 for switching the communication channel of the fixed stations 2 and 4, for example, and for setting a communication channel to a PBX. Thus, it shows that the portable station 1 is communication with terminal equipment equipped with the PBX, or a telephone (not shown in the drawings) connected with the PBX through the radio channel 3 and communication lines 7.

The operation state prior to the hand-over shown in FIG. 7B is that the switching of the communication channel to the fixed station 4 is determined by moving the portable station 1 from one communication zone to the other; the line control equipment 5 is connected with the fixed stations 2 and 4 with duplication of speech through the communication lines 7 and 9 by the time division switch 6 in previously setting operation; and the fixed stations 2 and 4 transmit identical communication information to the portable station 1 through the radio channels 3 and 8. However, the portable station 1 is still connected with the radio channel 3 of the fixed station 2 with the speech present. Also, while the radio channel 8 is being used for transmitting radiowaves from the fixed station 4 to the portable station 1, the portable station 1 does not receive the radiowaves yet, and the portable station 1 does not transmit radiowaves to the fixed station 4.

The speech state in FIG. 7C shows that the portable station 1 switches receiving and transmitting frequencies itself so as to be connected to the fixed station 4 through the radio channel 8. The connection of the line control equipment 5 with the fixed stations 2 and 4 is similar to that of FIG. 7B. The fixed station 2 still transmits the radiowaves to the portable station 1, but the portable station 1 does not receive the radiowaves yet.

The operation state in FIG. 7D shows that the portable station 1 receives a hand-over termination to release the double connection with the communication channels 3 and 8 in the states of FIGS. 7B and 7C, then, is turned in the normally speech state through the fixed station 4 and the communication lines 9.

As described above in the hand-over, it is necessary to switch the communication channel by a network switch located somewhere on the network comprised of the line control equipment and the like. In case of switching the communication channel, the technique of telephone switching system is applicable to the switching of the communication channel.

FIG. 8 shows the time division switch 6 for use in the line control equipment 5. The time division switch 6 is used for setting connection between the communication lines which are synchronized and multiplexed with the time division on a highway, the switching principle of which is roughly illustrated on FIGS. 9A, 9B, 9C and 9D.

FIGS. 9A and 9B diagrammatically illustrate a connection between a 4-channel incoming highway 11 and an outgoing highway 12 having the same number of channels by switching the time division switch 6. Combinations of character and numeral T1 to T4 denote time slots corresponding to each of the 4-channels, and F1 to F3 denote frames. FIGS. 9A and 9B show that, in the beginning, a second time slot T2 on the incoming highway 11 is connected with a third time slot T3 on the outgoing highway 12, and the communication lines 7 previously connected with the fixed station 2 is connected with the communication lines 9 connected with the fixed station 4 by the time division switch 6 so as to use a fourth time slot T4 on the outgoing highway 12.

FIG. 8 illustrates a construction of the time division switch 6 by which information of each time slot on the incoming highway 11 is, in turn, written into a speech path memory 13 (referring to as SPM in the drawings) on the basis of addresses indicated by a write-address change switch 15. The write-address change switch 15, in turn, indicates an address of the speech path memory 13 indicated by an output of a counter 16 which is actuated by a clock TSCL in synchronization with the timing of each time slot. Numbers 1, 2, ... n designated on the speech path memory 13 represent information storage regions for each time slot, therefore, number n is equal to 4, n=4,if a communication channel is of a 4-channel type as shown in FIG. 9A.

Content of the speech path memory 13 is read out by an address indicated by a read-address change switch 17 to be, in turn, outputted to the outgoing highway 12. The read-address change switch 17, in turn, indicates an address of the speech path memory 13 indicated by a speech-path memory address stored in a connection control memory 14 (referred to as CM in the drawings) so that a read-address change switch 18, in turn, indicates an address of the connection control memory 14.

The read-address change switch 18 is actuated by an address indicated by an output of the counter 16 in synchronization with the write-address change switch 15 as described previously. Numbers 1, 2, ... n designated on the connection control memory 14 represent read addresses of the speech path memory 13 for each time slot, n is equal to 4, n=4, because of the 4-channels as shown in FIG. 9A, which was previously described as the speech path memory 13 Thus, each address of the connection control memory 14 and the contents stored in each address thereof indicate which time slot on the incoming highway 11 is transferred to which time slot on the outgoing highway 12, thereby representing the connection state of the speech path on the time division switch 6. A microprocessor 19 rewrites the contents of the connection control memory 14 through a data bus 20 and an address bus 21 in response to a call from a switching system, as required, to switch the connection state of the speech path of the time division switch 6.

However, in case of using the time division switch 6 for the hand-over in the mobile communication system with the communication zones as shown in FIGS. 7A, 7B, 7C and 7D, and if it is necessary to ensure continuity of the communication information (referred to as seamless handover) prior to and after the hand-over, the following drawbacks result:

First, when rewriting the contents of the connection control memory 14 between the frames F1 and F2 as shown in FIGS. 9A and 9B, information of the time slot T2 up to the frame F1 on the incoming highway 11 is transferred to the fixed station 2 through the time slot T3 on the outgoing highway 12 and information of the time slot T2 after the frame F2 is transferred to the fixed station 4 through the time slot T4 on the outgoing highway 12, so that the continuity of the information transmission is retained without losing and duplicating the communication information in switching at a point shown by the arrow in FIG. 9B. Next description is not shown in the drawings, however, when the rewriting of the connection control memory 14 is carried out after the time of reading the speech path memory 13 for transferring information of the time slot T4 of the frame F2, transferring information of the time slot T4 of the frame F2 is not in time thereby not to transfer information of the time slot T2 of the frame F2 on incoming highway 11, causing loss of communication information. This is because a timing of the frames or the time slots is not synchronized with the timing when the microprocessor 19 writes information into the connection control memory 14 when using the conventional time division switch 6 shown in FIG. 8.

Second, the following drawbacks result as shown in FIGS. 9C and 9D, and FIGS. 10A and 10B:

FIGS. 9C and 9D show that a communication channel assigned to the time slot T2 on the incoming highway 11 is previously connected with the fixed station 2 through the time slot T3 on the outgoing highway 12, but connected with the fixed station 4 through the time slot T1 on the outgoing highway 12 by switching the time division switch 6 between the frames F1 and F2. The timing of writing and reading of the speech path memory 13 shown in FIG. 8 normally divides a single time slot into two so that the first half is assigned to the writing and the second half assigning to the reading. According to FIGS. 9C and 9D, the content written into the time slot T2 of the frame F1 is the same up to updating the time slot T2 of the following frame F2. Because of this, the content of the time slot T3 of the frame F1 on the outgoing highway 12 is similar to that of the time slot T1 of the frame F2 thereon. The switching timing described above is not shown in the drawings, but when the portable station 1 carries out the hand-over from the fixed station 2 to the fixed station 4, the portable station 1 communicates with the fixed station 2 up to the frame F1, then, when the portable station 1 is switched to the fixed station 4 from the frame F2, the portable station 1 receives information at the frame F2 duplicated with the frame F1, which destroys the continuity of the communication information.

FIGS. 10A and 10B show a state when the communication information is transferred from the portable station to the fixed station. That is, it shows that the fixed station 2 is previously connected to the time slot T2 on the outgoing highway 12 through the time slot T3 on the incoming highway 11, then by switching the time division switch 6 between the frames F1 and F2, the fixed station 4 is connected with the time slot T2 on the outgoing highway 12 through the time slot T1 on the incoming highway 11. According to the operation example of the time division switch 6 shown in FIG. 8, information of the time slot T1 of the frame F2 on the incoming highway 11 is transferred to the time slot T2 of the frame F2 on the outgoing highway 12, but, because of retaining the continuity of the communication information, information of the time slot T3 of the frame F1 on the incoming highway 11 must be transferred to the time slot T2 of the frame F2 on the outgoing highway 12, which causes loss of the information transferred from the portable station 1. This is because information on the incoming highway 11 is transferred to the outgoing highway 12 at the following frame when connecting the time slot T3 to the time slot T2 (it becomes that incoming information of the frame F1 is transferred at the frame F2) but the information is transferred at the same frames when connecting the time slot T1 to the time slot T2 as shown in FIG. 10B. That is, The information loss is caused by a different frame which is transferred to another on the basis of the combination of the time slots which are connected with both incoming and outgoing highways 11 and 12.

Accordingly, when the communication channel is switched by using the conventional time division switch 6 in the hand-over, it is disadvantageous in that the continuity of the communication information cannot be retained in switching the communication channel.

That is, when the communication channel of a wire network is switched by using the time division switch 6 in the hand-over of a mobile communication system, duplication and loss of the communication information results.

SUMMARY OF THE INVENTION

It is an object of the present invention to provide an intermittenceless switching system capable of achieving the hand-over of an mobile communication system for ensuring the continuity of communication information.

In an aspect of the present invention, there are provided the following three constructions:

Firstly, it comprises a time division switch in which a speech path memory is provided for two frames for each and while one information is being written into one frame, the other information is read from the other frame so that incoming information is not transferred to a different frame on the outgoing highway caused by combining a time slot on the incoming highway with a time slot on the outgoing highway in switching;

Secondly, it comprises that the switching of the time division switch in the connection state is carried out in synchronization with a frame-timing of the communication channel, preventing communication information from being lost by causing relationship between before and after timeing of a time slot on the outgoing highway in switching; and Thirdly, it comprises that when the portable station is switched from one first fixed station to the other fixed station, the time division switch is switched in synchronization with the switching of the portable station.

BRIEF DESCRIPTION OF THE DRAWINGS

FIG. 5 is another circuit diagram using a time division switch shown in FIG. 8;

FIG. 6 is another circuit diagram using a time division switch shown in FIG. 8;

DESCRIPTION OF THE PREFERRED EMBODIMENTS

Figure 1:
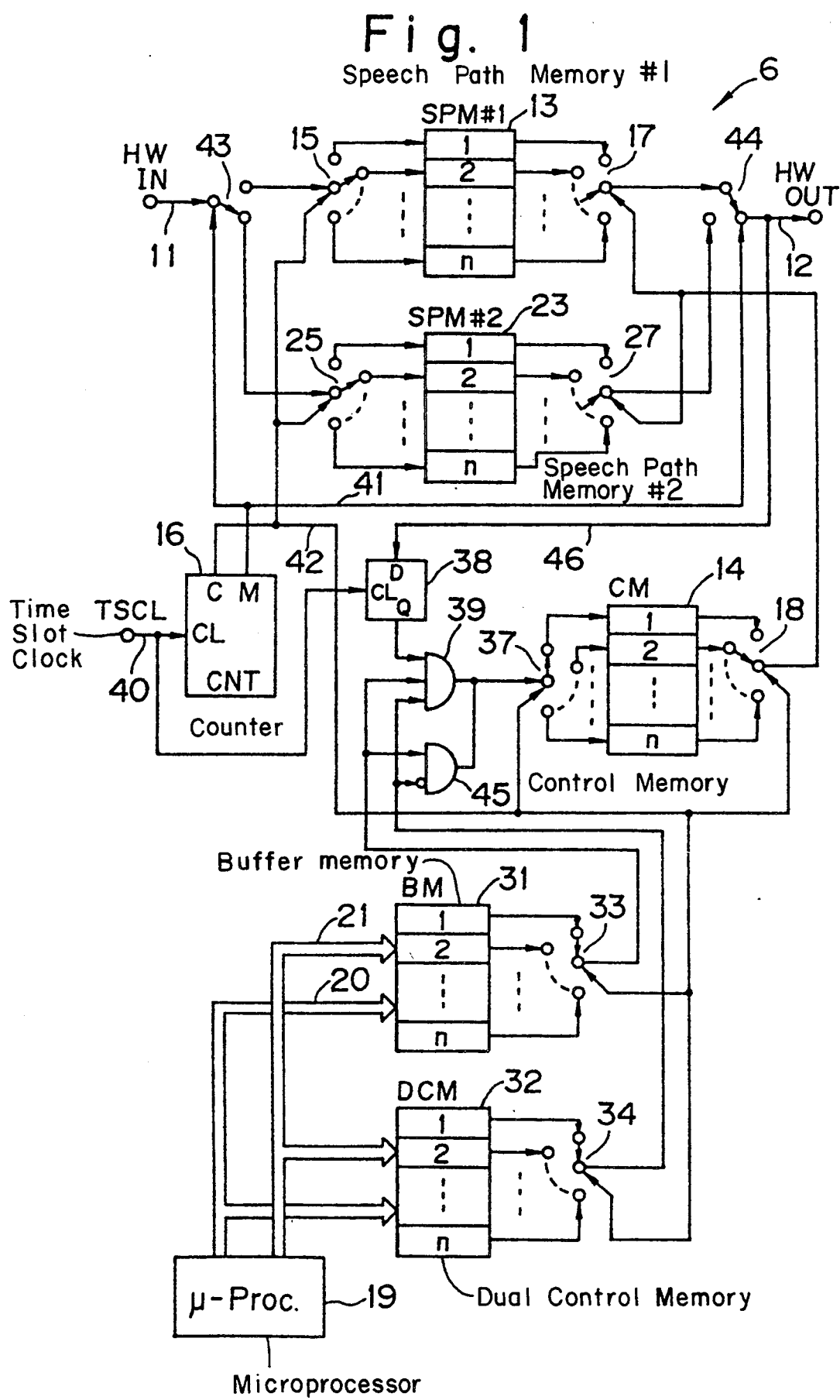
FIG. 1 is a circuit diagram showing a time division switch of an embodiment of the present invention.
Figure 7A:
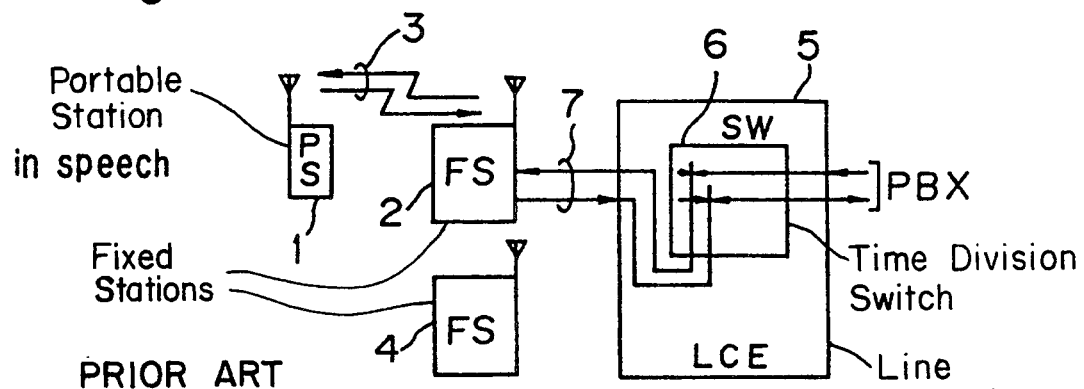
FIGS. 7A, 7B, 7C and 7D are block diagrams showing states of the hand-over carried out by a conventional time division switch.

Hereinafter, embodiments of the present invention are described with reference to drawings. FIG. 1 shows a time division switch 6 of the present invention including construction similar to the conventional switch shown in FIG. 8 already described above, therefore, the same reference numerals used in FIG. 8 are used in FIG. 1, reference numerals and constructions already described previously are also used and FIGS. 7A, 7B, 7C and 7D are used as reference for describing the embodiments. With reference to the drawings, differences between FIGS. 1 and 8 are mainly described below.

The first difference from FIG. 8 is that the time division switch 6 has a speech path memory 13, a write-address change switch 15 and a read-address change switch 17, which are exactly identical components shown in FIG. 1, also having a speech path memory 23, a write-address change switch 25 and a read-address change switch 27. These pairs of the speech path memories 13 and 23, the write-address change switches 15 and 25, and the read-address change switches 17 and 27 are connected with an incoming highway 11 and an outgoing highway 12, respectively, through frame change switches 43 and 44 which are switched at a frame-timing. Also, the frame change switches 43 and 44 are switched by an output signal 41 of a most significant bit M of a counter 16 which counts timing of time slots. The most significant bit M alternately changes "1" and "0" at every frame, and is a type of adding one more bit to the most significant bit M of the counter 16 shown in FIG. 8. In the frame change switches 43 and 44 shown in FIG. 1, in case of a frame which is connected with the writing side of the speech path memory 23 to the incoming highway 11, the outgoing highway 12 is connected with the reading side of the speech path memory 13, and in case of a frame which is connected with the speech path memory 13 to the incoming highway 11, the outgoing highway 12 is connected with the speech path memory 23, so that above connection operation is alternately carried out at every frame. The write-address change switches 15 and 25 and the read-address change switches 17 and 27 are actuated by reading results from an output C of the counter 18 and the connection control memory 14, respectively, thereby to be indicated its address in synchronization with each other. As a result, information of all time slots of a frame is written into either one of the speech path memories 13 or 23, in the following frame, the information is, in turn, read from one of the speech path memory 13 or 23 in the order of addresses indicated by the connection control memory 14. The switching operation above is illustrated in FIGS. 2A, 2B, 2C and 2D so that the state of the time slot T2 on the incoming highway 11 connecting with the time slot T3 on the outgoing highway 12 through the time division switch 6, is switched to the state thereof on the incoming highway 11 connecting with the time slot T1 on the outgoing highway 12.

Figure 2A:
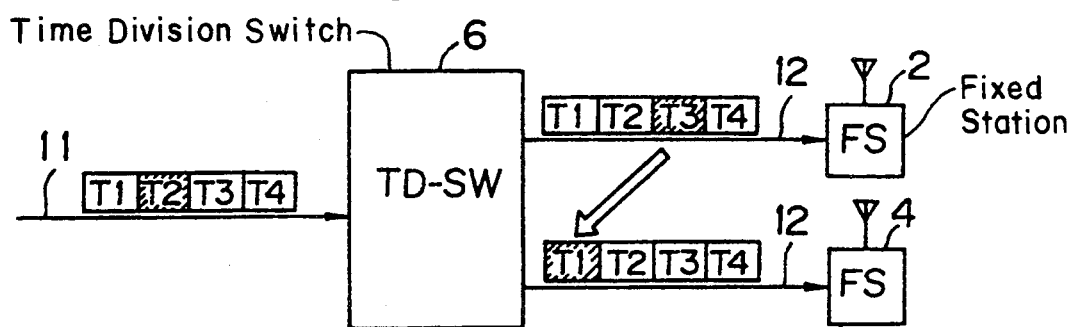
FIGS. 2A, 2B, 2C and 2D are timing diagrams showing the timing relationship between incoming and outgoing communication information in accordance with the switch shown in FIG. 1.
Figure 2B:
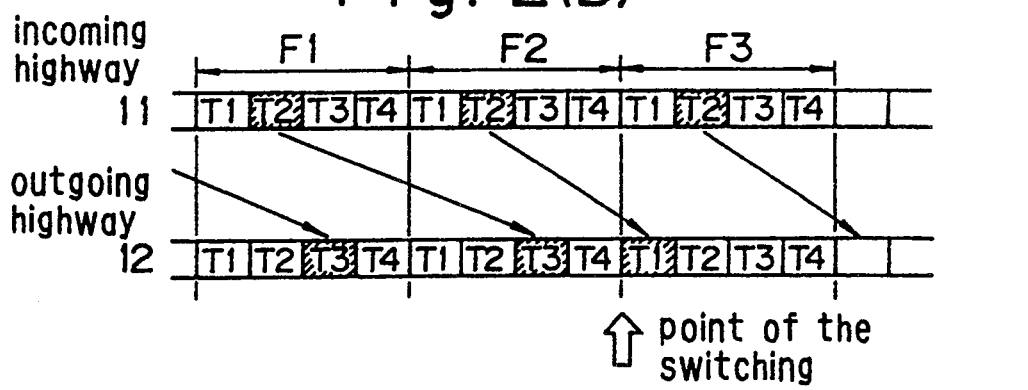

As illustrated on FIGS. 2A and 2B, when the time slots on the incoming highway 11 are connected with the time slots on the outgoing highway 12 by the time division switch 6 and the above switching is carried out between the frames F2 and F3, incoming information of the time slot T2 of the frame F1 on the incoming highway 11 is transferred to the time slot T3 of the frame F2 on the outgoing highway 12, and also that of the time slot T2 of the frame F2 on the incoming highway 11 is transferred to the time slot T1 of the frame F3 on the outgoing highway 12, thereby eliminating information loss in switching and ensuring the information continuity.

Figure 8:
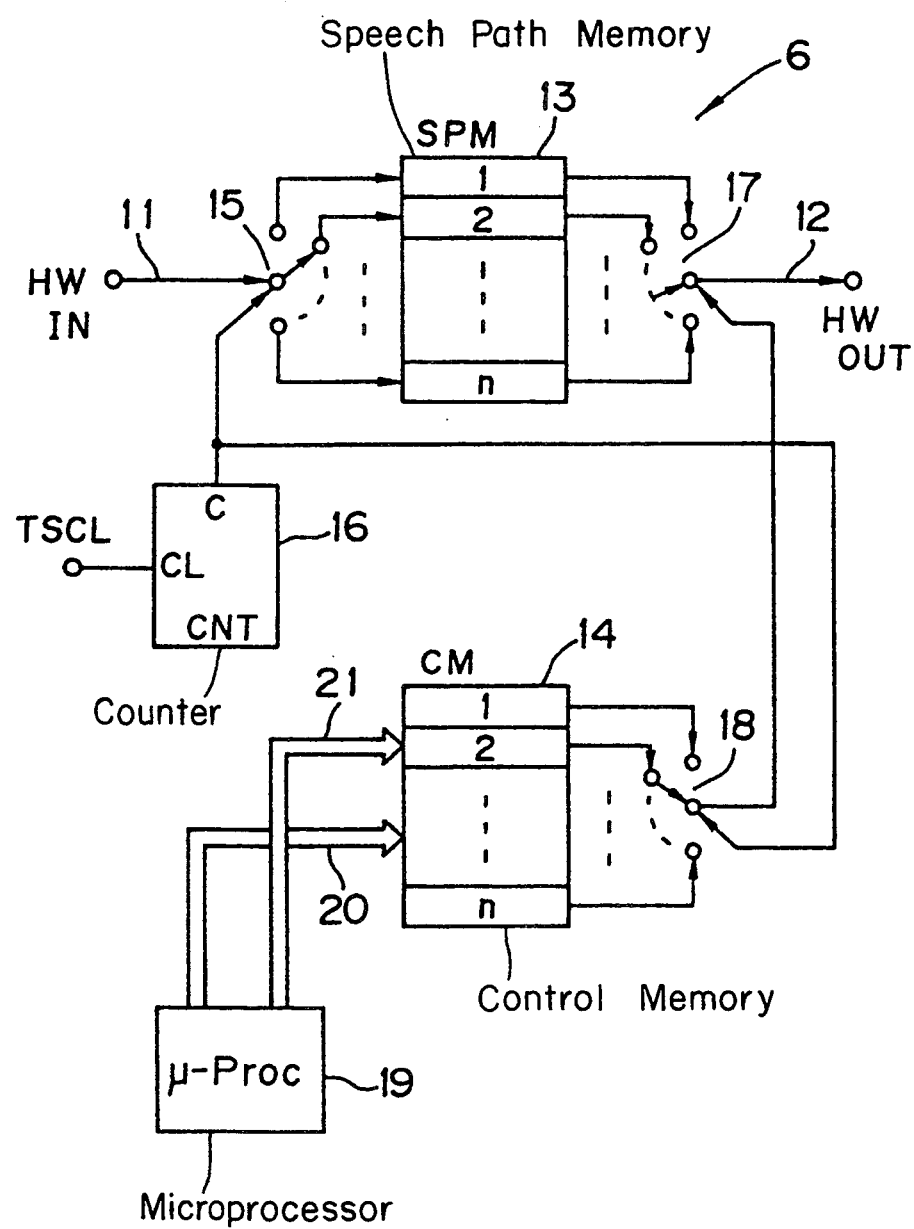
FIG. 8 is a circuit diagram showing the conventional time division switch.
Figure 9A:
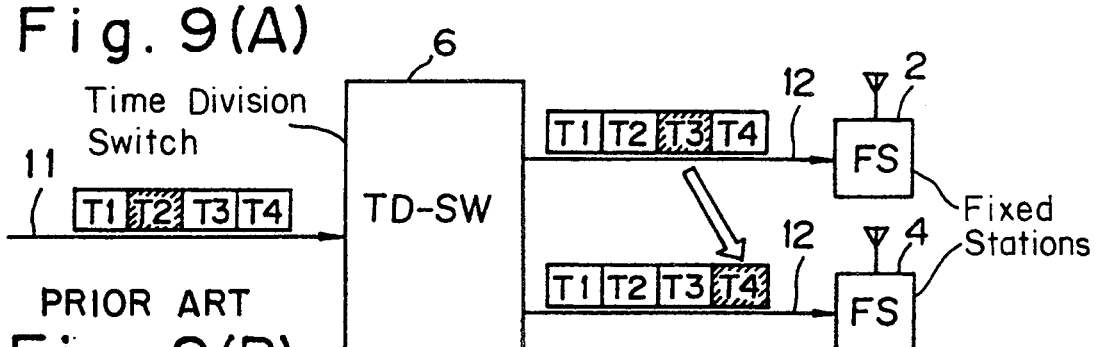
FIGS. 9A, 9B, 9C and 9D are timing diagrams showing the timing relationship between incoming and outgoing communication information in accordance with the switch shown in FIG. 8.
Figure 9B:
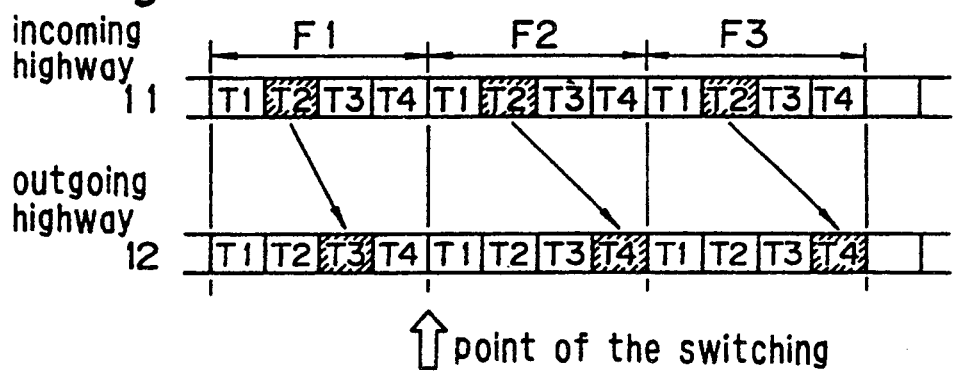
Figure 9C:
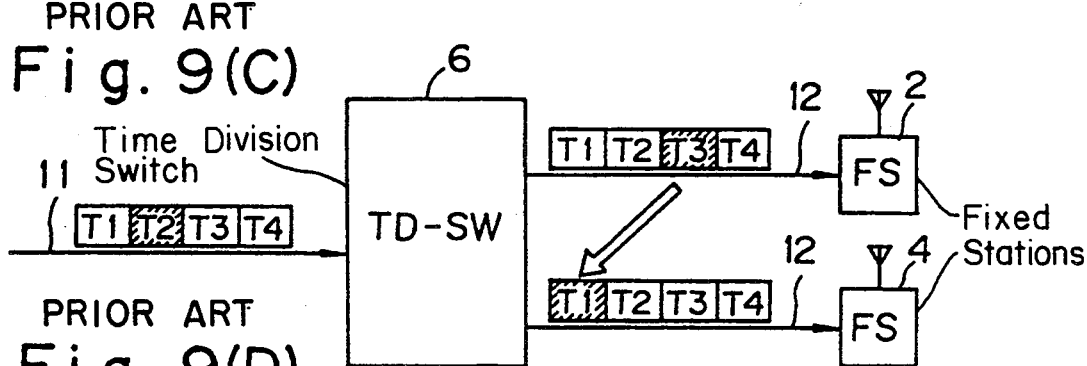
Figure 9D:
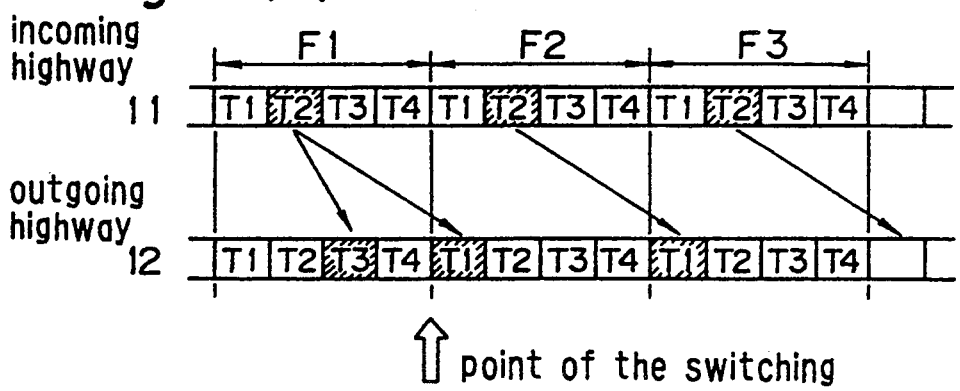
Figure 10A:
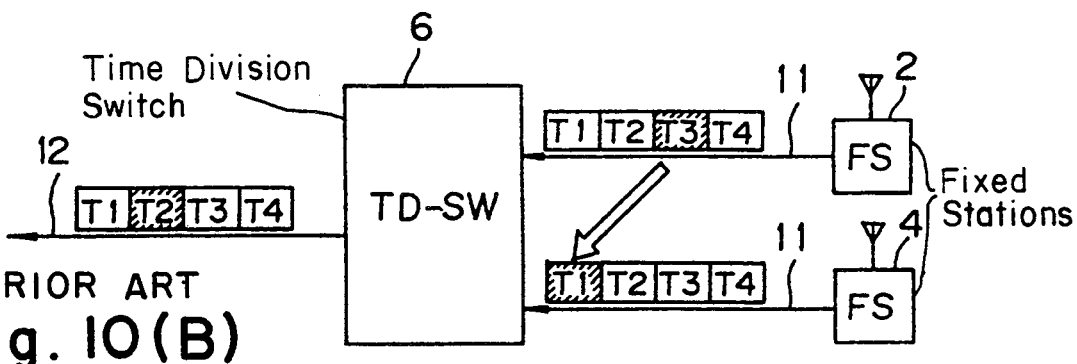
FIGS. 10A and 10B are timing diagrams showing the timing relationship between incoming and outgoing communication information in accordance with the switch shown in FIG. 8.
Figure 10B:
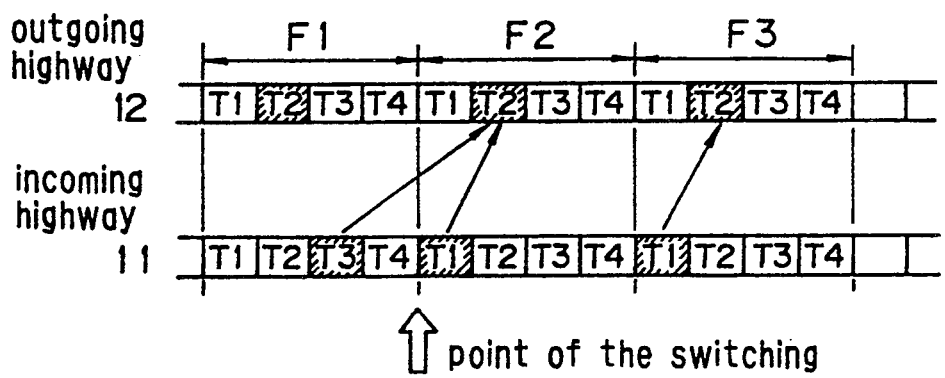

In contrast, in the case of using the time division switch 6 shown in FIG. 8, the incoming information of the time slot T2 of the frame F1 on the incoming highway 11 is transferred in duplication to the time slot T3 of the frame F1 and the time slot T1 of the frame F2 so as to switch between the frames F1 and F2 shown in FIGS. 9C and 9D, which does not retain the communication continuity.

Figure 2C:
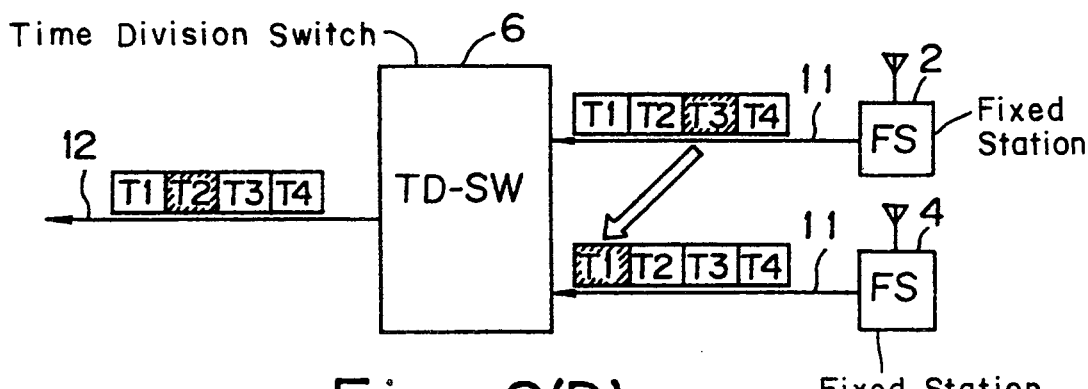
Figure 2D:
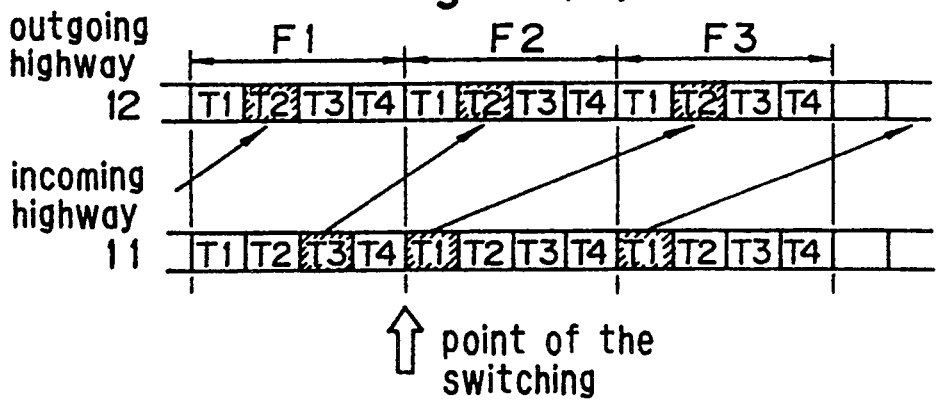

As illustrated on FIGS. 2C and 2D, conversely it is shown that the time slots on the incoming highway 11 from the fixed stations 2 and 4 are switched between the frames F1 and F2 on the outgoing highway 12 which is connected with the PBX. In this case, incoming information of the time slot T3 of the frame F1 on the incoming highway 11 is transferred to the time slot T2 of the frame F2 on the outgoing highway 12 and that of the time slot T1 of the frame F2 on the incoming highway 11 is transferred to the time slot T2 of the frame F3 on the outgoing highway 12, obtaining the similar advantages described above.

In contrast, when using the time division switch 6 shown in FIG. 8, the following description is not referred to the drawings, but since both information from the time slot T3 of the frame F1 and the time slot T1 of the frame F2 become an outputting timing of the transfer to the time slot T1 of the frame F2, the information of the time slot T3 of the frame F1 is written over the time slot T1 of the frame F2 at the speech path memory 13 thereby not to be practically transferred thereto, so that the incoming information of the time slot T3 of the frame F1 is lost and does not retain the information continuity before and after switching the time division switch 6.

The second difference from FIG. 8 is that the writing information to the connection control memory 14 is not directly carried out from a micro processor 19, but the information is stored in a buffer memory 31 (referred to as BM in the drawings), then written into the connection control memory 14 in synchronization with timing of the time slots.

That is, the information written into the buffer memory 31 through the data bus 20 and address bus 21 from the micro processor 19 is, in turn, read through the read-address change switch 33 and written into the connection control memory 14 through a gate 39 or 45 and the write-address change switch 37 for the connection control memory 14. The read-address change switch 33, the write-address change switch 37 and the read-address change switch 18 are all actuated by the output signal 42 from the output C of the counter 16 to act in sychronization with each other, but the read-address change switch 18 indicates an address which is one count preceding the address indication of the read-address change switch 33 and the write-address change switch 37. Accordingly, since the connection control memory 14 is updated at a timing of the following time slot after an address is read out therefrom, it is impossible to cause variation between the writing information to the connection control memory 14 and the timing of the information transfer to the outgoing highway 12 as described with the conventional time division switch 6 shown in FIG. 8.

The third difference from FIG. 8 is that the time division switch 6 has a function which switches the connection in synchronization with the hand-over of the portable station 1. The function is carried out by a double-connection control memory 32 (referring to as DCM in the drawings), a D-flip flop circuit 38, an AND gates 39 and 45.

Figure 3:
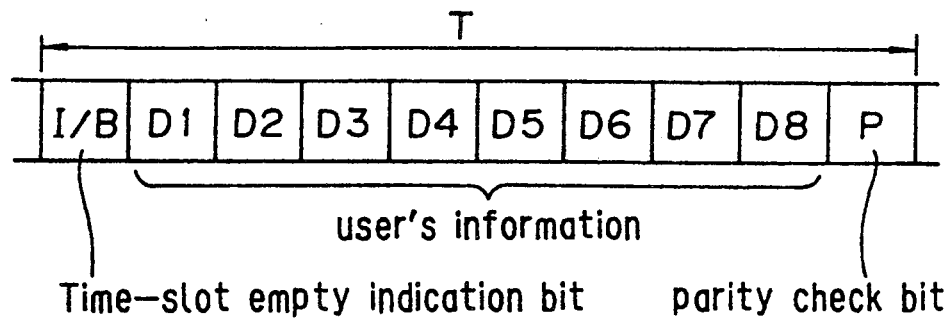
FIG. 3 is a formatting diagram showing transferred information on the incoming and outgoing highways.

Because of the function, a communication information format on the highway has a time-slot empty indication bit I/B representing whether a time slot is in use or not as shown in FIG. 3. That is, when changing from the state prior to the hand-over shown in FIG. 7B to the state of the hand-over termination shown in FIG. 7C, the time-slot empty indication bit I/B of a time slot which has transferred the last information received from the portable station 1 is turned to an empty indication (logical "1" in this case) by the fixed station 2. The time-slot empty indication bit I/B makes the D-flip flop 38 set through a conductor 46 shown in FIG. 1 thereby an output Q of the D-flip flop 38 is changed to the logical "1". At the time, if the content of the double-connection control memory 32 corresponding to a time slot is the logical "1" (each address of the double-connection control memory 32 corresponds to 1-bit), the content of the buffer memory 31 is transferred to the connection control memory 14, and the communication channel is switched to a state which is indicated by the content of the buffer memory 31 from the following frame.

Figure 7B:
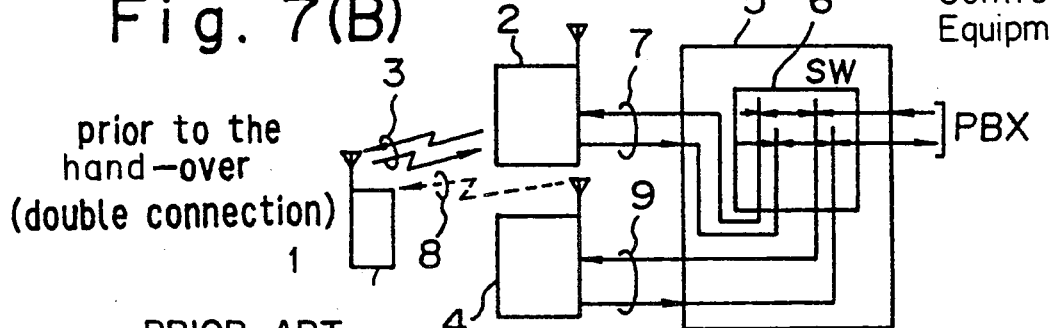
Figure 7C:
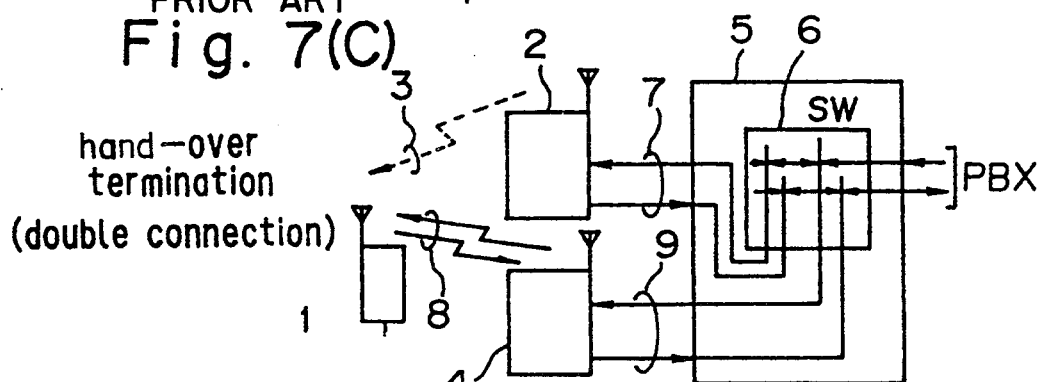

The double-connection control memory 32 is a memory having a bit per each time slot, in the state of double connection shown, the state prior to the hand-over in FIG. 7B, and the state after the hand-over in FIG. 7C, the content of the connection control memory 14 can be previously set so that the highway directed from the PBX to the fixed stations 2 and 4 transfers a time slot corresponding to an address of either the speech path memory 13 or 23 on the incoming highway 11 to a time slot assigned to the connection with the fixed stations 2 and 4 on the outgoing highway 12.

It is impossible to basically cause the double connection as described with FIGS. 7B and 7C on the highway directed from the fixed stations 2 and 4 to the PBX, practically, the portable station 1 is switched from the connection with the fixed station 2 to the fixed station 4, at the moment, it is necessary to switch the connection of the time division switch 6, that is, the connection from the fixed station 2 to the PBX is switched to the connection from the fixed station 4 to the PBX.

At this time, the connection information for the communication channel in relation to the connection from the fixed station 4 to the PBX is stored in the buffer memory 31 and the logical "1" is supplied to the double-connection control memory 32 indicated by a corresponding address, and when the portable station 1 is switched the communication channel from fixed station 2 to fixed station 4, according to the time-slot empty indication bit I/B of the time slot which is just before transferred information from the fixed station 2, it is previously notified that the communication channel of the fixed station 2 becomes empty, so that the time division switch 6 is switched to the communication channel of the fixed station 4 from the following frame.

As described above, at the time of switching the communication channel is not a double connection, and the content of the corresponding address of the double-connection control memory 32 is the logical "0". In the above case, the content of the time-slot empty indication bit I/B is ignored, and the content of the buffer memory 31 is written into the connection control memory 14 in synchronization with the timing of a time slot through the AND gate 45. It is noted that designations D1 to D8 represent information and P represents a parity check bit on a time slot T as shown in FIG. 3.

Figure 4:
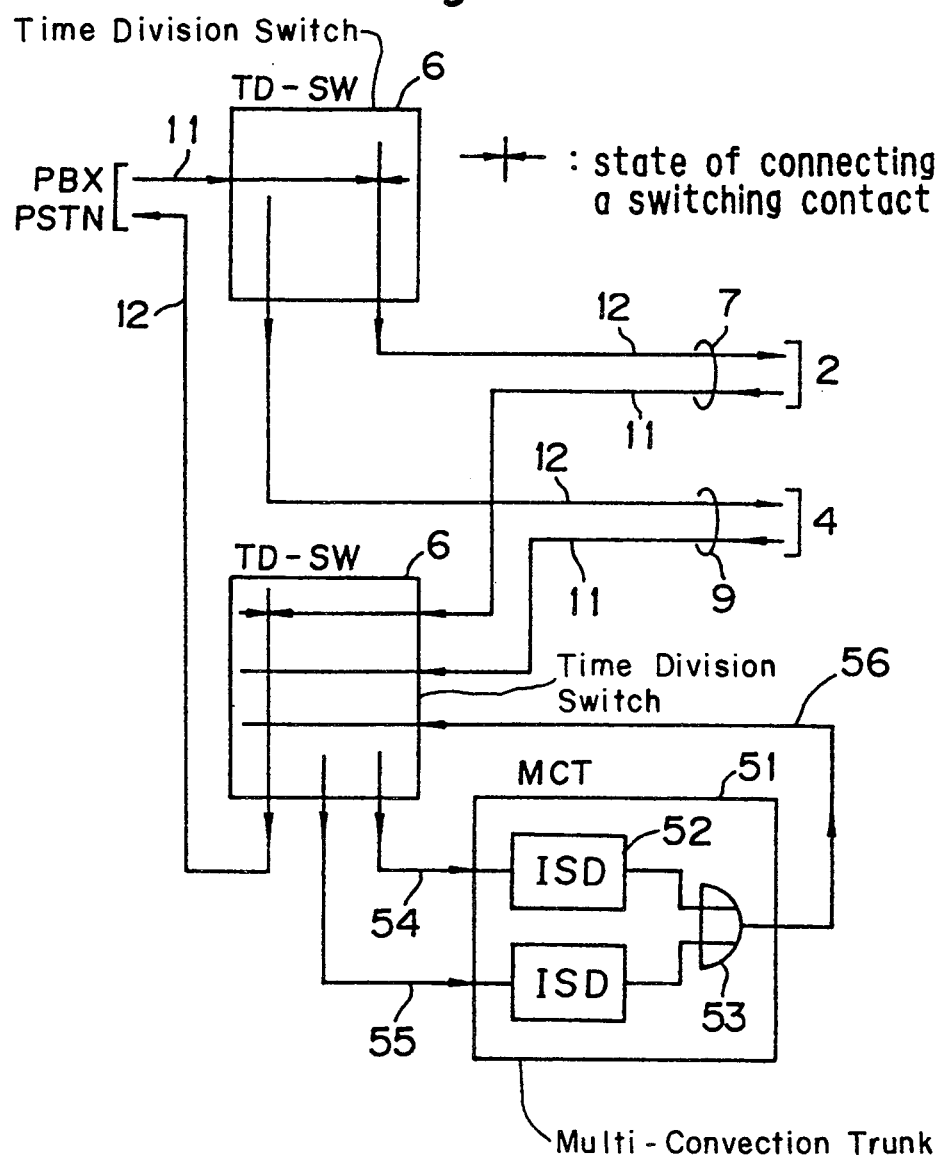
FIG. 4 is a circuit diagram using a time division switch shown in FIG. 8.

FIGS. 4, 5 and 6 show other embodiments of the present invention. Each of the embodiments use a type of time division switch 6 shown in FIG. 8 which does not have the function (the third differences from FIG. 8 described above) for switching the communication channel in synchronization with the communication line switching of the portable station 1, or use a space division switch instead of the time division switch 6 shown in FIG. 1.

Figure 7D:
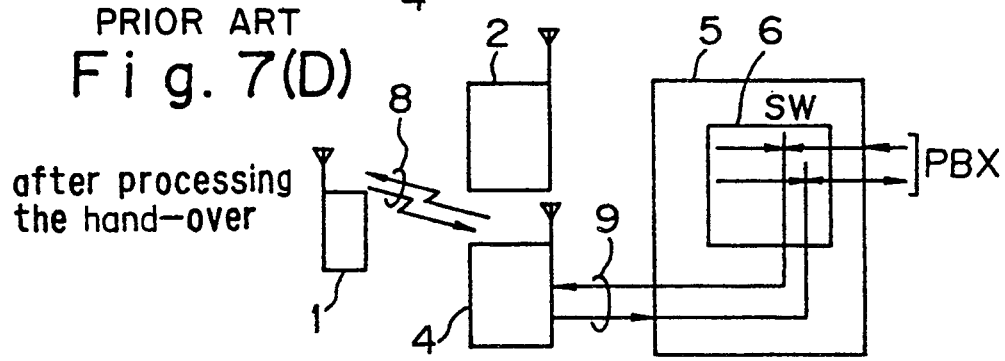

As shown in FIGS. 7A, 7B, 7C and 7D, FIG. 4 corresponds to FIG. 7A showing in speech, FIG. 5 corresponding to FIGS. 7B and 7C showing the double connection, and FIG. 6 corresponding to FIG. 7D showing the operation after the hand-over.

FIG. 4 shows a circuit diagram using the time division switch 6 shown in FIG. 8. According to FIG. 4, both the incoming and outgoing highways 11 and 12 on the communication lines 7 corresponding to the fixed station 2 are connected with the PBX or a PSTN (Public Switched Telephone Network) through the time division switch 6. The fixed station 4 and a MCT (Multi-Convection Trunk) 51 are not connected with anywhere. A reference numeral 52 denotes a ISD (Idle Signal Detector), 53 denoting an OR gate, 54 and 55 denoting incoming lines. Remainder of reference numerals have been described previously.

FIG. 5 shows another circuit diagram using the time division switch 6 shown in FIG. 8. According to FIG. 5, the incoming highway 11 directed from the PBX and PSTN to the fixed stations 2 and 4 is connected in double with the outgoing highway 12 directed toward the fixed stations 2 and 4 by the time division switch 6, so that identical information is transferred to the fixed stations 2 and 4. The incoming highway 11 directed from the fixed stations 2 and 4 to the PBX and PSTN is connected with the incoming lines 54 and 55 of the multi-convection trunk 51 through the time division switch 6 and an outgoing line 56 of the multi-convection trunk 51 is connected with the outgoing highway 12 directed toward the PBX and PSTN through the time division switch 6. The idle signal detector 52 in the multi-convection trunk 51 examines an incoming signal. If the incoming signal does not have communication information, transferring operation is not carried out otherwise transferring the communication information to the outgoing highway 12.

Examination of the incoming signal can be carried out by the time-slot empty indication bit I/B shown in FIG. 3. Also, when the incoming signal is not transmitted from the portable station 1, it can be determined that a logical "0" is supplied to all bits of the time slots. Each output of the idle signal detectors 52 in the multi-convection trunk 51 is operated by the logical sum, the output of which is transferred to the incoming highway 11 through the time division switch 6.

In the case of the state shown in FIG. 7B, since the incoming line 54 connected with the multi-convection trunk 51 from the fixed station 2 has communication information, the incoming line 54 is connected with the PBX and PSTN through the time division switch 6. In the case of the state shown in FIG. 7C, the incoming line 55 connected with the multi-convection trunk 51 from the fixed station 4 is connected with the PBX and PSTN through the time division switch 6.

FIG. 6 shows another circuit diagram using the time division switch 6 shown in FIG. 8. FIG. 6 corresponds to the state shown in FIG. 7D. The fixed station 4 is connected with the PBX and PSTN through the time division switch 6, and the fixed station 2 and multi-convection trunk 51 are not connected with anywhere.

According to the embodiments of the present invention, when the connection of the wire network is switched to require for the hand-over in the mobile communication system, the duplication and loss of the communication information are eliminated and ensured the information continuity.

What is claimed is:

1. An intermittenceless switching system including a time division switch for providing interconnection between a network communication channel and a plurality of time division multiplex communication channels, comprising:

a system input connectable to receive data from the plurality of time division multiplex communications channels;

a system output connectable to transmit data from the system to the network communication channel;

first and second speech path memories, each having sufficient capacity to store a frame of data comprising a plurality of time slots and each having an input and an output;

first and second write address change switches connected to said input of said first and second speech path memories respectively;

first and second read address change switches connected to said output of said first and second speech path memories respectively;

a memory write switch connected to said system input and said first and second write address change switches to selectively switch data from the system input to one of said first and second write address change switches;

a memory read switch connected to said first and second read address change switches to selectively connect one of said first and second read address change switches to said system output;

memory switch control means for continuously alternating the connections established by said memory read switch and said memory write switch so that data is written to said first speech path memory while it is read from said second speech path memory and read from said first speech path memory while it is written to said second speech path memory;

processing means for generating switch control information specifying desired operation of said first and second read address change switches and said first and second write address change switches;

buffer memory means connected to said processing means and having a buffer memory means output, for receiving switch control information from said processing means, buffering said switch control information, and transmitting said switch control information to said buffer memory means output in synchronism with a time slot clock; and connection control means connected to said buffer memory means output, said first and second write address change switches, and said first and second read address change switches, for controlling the operation of said read address change switches and said write address change switches according to said switch control information received from said buffer memory means output.

2. The system of claim 1 wherein said buffer memory means further comprises monitoring means connected to said system output and said buffer memory means, for monitoring said system output and producing an indication signal in response to the occurrence of a predetermined condition in said system output, and wherein said buffer memory means further comprises means for receiving said indication signal and transmitting said switch control information in response to said indication signal.

3. The system of claim 1 further comprising double detection circuit means connected to said processing means and said connection control means, for preventing said buffering means from transferring said switch control information until said transfer can occur in synchronization with a hand-over.

* * * * *